United States Patent
Tanaka

(10) Patent No.: US 12,473,274 B2
(45) Date of Patent: Nov. 18, 2025

(54) HETEROCYCLIC COMPOUND AS INHIBITOR OF CASEIN KINASE 1-δ AND/OR ACTIVIN RECEPTOR-LIKE KINASE 5

(71) Applicant: Alchemedicine, Inc., Tsukuba (JP)

(72) Inventor: Keigo Tanaka, Tsukuba (JP)

(73) Assignee: ALCHEMEDICINE, INC., Ibaraki (JP)

(*) Notice: Subject to any disclaimer, the term of this patent is extended or adjusted under 35 U.S.C. 154(b) by 395 days.

(21) Appl. No.: 17/925,904

(22) PCT Filed: Jun. 24, 2021

(86) PCT No.: PCT/JP2021/023905
§ 371 (c)(1),
(2) Date: Nov. 17, 2022

(87) PCT Pub. No.: WO2021/261544
PCT Pub. Date: Dec. 30, 2021

(65) Prior Publication Data
US 2023/0183220 A1    Jun. 15, 2023

(30) Foreign Application Priority Data

Jun. 25, 2020 (JP) ................ 2020-109452

(51) Int. Cl.
*C07D 405/14* (2006.01)
(52) U.S. Cl.
CPC .................. *C07D 405/14* (2013.01)
(58) Field of Classification Search
CPC .................................................. C07D 405/14
See application file for complete search history.

(56) References Cited

U.S. PATENT DOCUMENTS

| | | | |
|---|---|---|---|
| 11,180,473 B2 * | 11/2021 | Bassaganya-Riera | ................ A61P 19/02 |
| 2003/0166633 A1 | 9/2003 | Gaster et al. | |
| 2016/0296505 A1 | 10/2016 | Koizumi et al. | |

FOREIGN PATENT DOCUMENTS

| | | |
|---|---|---|
| JP | 2003-524010 A1 | 8/2003 |
| JP | 2004-517068 A | 6/2004 |
| JP | 2005-508344 A | 3/2005 |
| JP | 2014-503527 A | 2/2014 |
| JP | 2018-509438 A | 4/2018 |
| WO | WO 01/062756 A1 | 8/2001 |
| WO | WO 02/40468 A1 | 5/2002 |
| WO | WO 03/029210 A2 | 4/2003 |
| WO | WO 2008/071605 A2 | 6/2008 |
| WO | WO 2009/047163 A1 | 4/2009 |
| WO | WO 2012/080727 A2 | 6/2012 |
| WO | WO 2012/085721 A1 | 6/2012 |
| WO | WO 2015/064768 A1 | 5/2015 |
| WO | WO 2016/149756 A1 | 9/2016 |

OTHER PUBLICATIONS

International Preliminary Report on Patentability and its annex (Chapter II of the Patent Cooperation Treaty) for PCT/JP2021/023905; I.A. fd Jun. 24, 2021, report completed Oct. 13, 2021, by the Japan Patent Office, Tokyo, Japan.

International Search Report for PCT/JP2021/023905; I.A. fd Jun. 24, 2021, mailed Aug. 17, 2021, by the Japan Patent Office, Tokyo, Japan.

Xu Y, et al., Functional consequences of a CKIδ mutation causing familial advanced sleep phase syndrome. Nature. Mar. 31, 2005;434(7033):640-4. doi: 10.1038/nature03453. PMID: 15800623.

Meng QJ, et al., "Entrainment of disrupted circadian behavior through inhibition of casein kinase 1 (CK1) enzymes." Proc Natl Acad Sci U S A. Aug. 24, 2010;107(34):15240-5. doi: 10.1073/pnas.1005101107. Epub Aug. 9, 2010. PMID: 20696890; PMCID: PMC2930590.

Medicherla S, et al., Antitumor activity of TGF-β inhibitor is dependent on the microenvironment. Anticancer Res. Nov.-Dec. 2007;27(6B):4149-57.

* cited by examiner

*Primary Examiner* — John S Kenyon
*Assistant Examiner* — Rehana Ismail
(74) *Attorney, Agent, or Firm* — Sterne, Kessler, Goldstein & Fox P.L.L.C.

(57) ABSTRACT

An object of the present invention is to provide a compound having CK1δ inhibition activity and/or ALK5 inhibition activity and the like. The object thereof can be attained by a compound represented by the following formula (1):

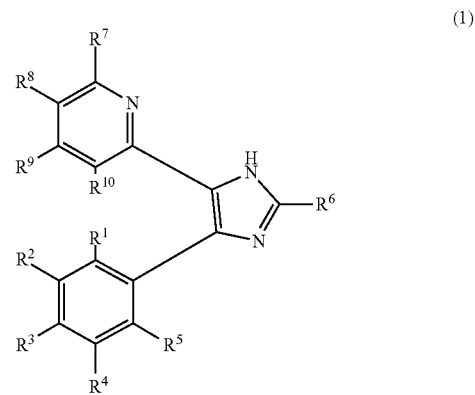

wherein
R$^1$ to R$^{10}$ each independently represent hydrogen, alkyl, cycloalkyl, or a halogen, wherein
R$^2$ and R$^3$ or R$^4$ and R$^5$ together with two carbon atoms to which they are attached form a 5-membered ring containing one heteroatom selected from the group consisting of an oxygen atom, a nitrogen atom, and a sulfur atom, optionally substituted with alkyl;
or a pharmaceutically acceptable salt thereof, wherein the compound excludes 2-[4-(2,3-dihydro-5-benzofuranyl)-2-(1,1-dimethylethyl)-1H-imidazol-5-yl]-6-methylpyridine.

16 Claims, No Drawings

HETEROCYCLIC COMPOUND AS INHIBITOR OF CASEIN KINASE 1-δ AND/OR ACTIVIN RECEPTOR-LIKE KINASE 5

BACKGROUND OF THE INVENTION

Field of the Invention

The present invention relates to compounds, inhibitors of casein kinase 1δ and/or activin receptor-like kinase 5, therapeutic medicaments for circadian rhythm sleep disorders, therapeutic medicaments for Alzheimer-type dementia, therapeutic medicaments for corneal dystrophy, cancer therapeutic medicaments, and therapeutic medicaments for androgenetic alopecia.

Description of Related Art

The sleep-wake rhythm is regulated by a biological clock to be aligned with an approximately one-day rhythm. Such a rhythm is called circadian rhythm. While the cycle of the human biological clock is about 25 hours long, the cycle of one day on the earth is 24 hours long, resulting in a misalignment of about one hour. Usually, this one-hour misalignment is modified in response to a variety of stimuli (such as light, exercise, and meal). However, if the state where this misalignment cannot be modified and continues for a long time, this disturbs sleep and wake at appropriate times. Attempts to forcibly modify this misalignment may cause physical disorders such as fatigue, anorexia, and headache in some cases. Such circadian rhythm-associated sleep disorders are called circadian rhythm sleep disorders.

It is known that familial advanced sleep phase syndrome, one of the circadian rhythm sleep disorders, is a disease caused by a point mutation of the human casein kinase 1δ (CK1δ) gene (Nature 2005, 434, 640-644), and it is suggested that the human circadian rhythm is fluctuated by modulation of CK1δ. It is also reported that CK1δ is involved in the control of the circadian rhythms of rodents such as mice, and non-rodents such as monkeys (Proc. Natl. Acad. Sci. USA, 2010, 107, 15240-15245).

There are also several reports in non-clinical studies that CK1δ inhibitors change the circadian rhythm in vitro and in vivo, placing expectations on CK1δ inhibitors as therapeutic medicaments for circadian rhythm sleep disorders.

The relation between CK1δ and the Alzheimer-type dementia is also reported (Japanese Translation of PCT International Application Publication No. 2014-503527). Specifically, it is believed that the Alzheimer-type dementia is caused by intracellular aggregation of hyperphosphorylated tau protein (neurofibrillary tangle), and it is suggested that phosphorylation of the tau protein is caused by CK1δ. For this reason, it is expected that the Alzheimer-type dementia is treated by inhibiting CK1δ.

The relation between corneal dystrophy (International Publication No. WO 2015/064768) or cancer (Anticancer Res. 2007, 27, 4149-4158) and activin receptor-like kinase 5 (ALK5) is also reported. ALK5 is properly referred to as activin receptor-like kinase although it is also referred to as activin-like kinase in a shorter name. It is reported that corneal dystrophy is caused by induction of cell death of corneal endothelial cells through an endoplasmic reticulum stress response by denatured protein excessively accumulated in corneal tissues, and the endoplasmic reticulum stress is caused by activation of ALK5 (TGF-β type I receptor) signal. While it is known that TGF-β has an effect of suppressing cell proliferation, it is reported that TGF-β promotes the proliferation and metastasis of cancer cells in the later canceration stage. For this reason, it is expected that corneal dystrophy and cancer are treated by inhibiting ALK5. For example, the compounds according to Japanese Translation of PCT International Application Publication No. 2004-517068 and International Publication No. WO 2001/062756 are reported as ALK5 inhibitors.

Related Art Literatures

Patent Literature 1: Japanese Translation of PCT International Application Publication No. 2014-503527
Patent Literature 2: International Publication No. WO
Patent Literature 3: Japanese Translation of PCT International Application Publication No. 2004-517068
Patent Literature 4: International Publication No. WO 2001/062756
Non Patent Literature 1: Nature 2005, 434, 640-644
Non Patent Literature 2: Proc. Natl. Acad. Sci. USA, 2010, 107, 15240-15245
Non Patent Literature 3: Anticancer Res. 2007, 27, 4149-4158

SUMMARY OF THE INVENTION

Technical Problem

An object of the present invention is to provide a compound having CK1δ inhibition activity and/or ALK5 inhibition activity, and an inhibitor of CK1δ and/or ALK5, a therapeutic medicament for circadian rhythm sleep disorders, a therapeutic medicament for Alzheimer-type dementia, a therapeutic medicament for corneal dystrophy, a cancer therapeutic medicament, a therapeutic medicament for androgenetic alopecia which contain the compound.

Solution to Problem

The present inventors, who have conducted extensive research, have found that a compound having a predetermined structure has CK1δ inhibition activity and/or ALK5 inhibition activity, and have completed the present invention.

The present invention includes embodiments below.

[1]
A compound represented by the following formula (1):

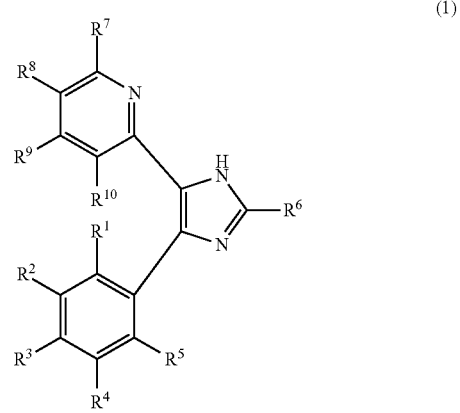

wherein
R¹ to R¹⁰ each independently represent hydrogen, alkyl, cycloalkyl, or a halogen, wherein
R² and R³ or R⁴ and R⁵ together with two carbon atoms to which they are attached form a 5-membered ring containing one heteroatom selected from the group consisting of an oxygen atom, a nitrogen atom, and a sulfur atom, optionally substituted with alkyl;
or a pharmaceutically acceptable salt thereof, wherein the compound excludes 2-[4-(2,3-dihydro-5-benzofuranyl)-2-(1,1-dimethylethyl)-1H-imidazol-5-yl]-6-methylpyridine.

[2]
The compound according to [1] or a pharmaceutically acceptable salt thereof, wherein
R¹ to R¹⁰ each independently represent hydrogen, alkyl, or a halogen, wherein
R² and R³ or R⁴ and R⁵ together with two carbon atoms to which they are attached form a 5-membered ring containing one heteroatom selected from the group consisting of an oxygen atom, a nitrogen atom, and a sulfur atom, optionally substituted with alkyl.

[2-1]
The compound according to [1] or [2] or a pharmaceutically acceptable salt thereof, wherein R¹ to R⁵ are hydrogen, excluding R² and R³ or R⁴ and R⁵ which form a 5-membered ring.

[2-2]
The compound according to any one of [1] to [2-1] or a pharmaceutically acceptable salt thereof, wherein R⁶ is hydrogen, alkyl, or cycloalkyl.

[2-3]
The compound according to any one of [1] to [2-2] or a pharmaceutically acceptable salt thereof, wherein R⁶ is hydrogen or alkyl.

[2-4]
The compound according to any one of [1] to [2-3] or a pharmaceutically acceptable salt thereof, wherein R⁶ is hydrogen.

[2-5]
The compound according to any one of [1] to [2-4] or a pharmaceutically acceptable salt thereof, wherein R⁷ is hydrogen or alkyl.

[2-6]
The compound according to any one of [1] to [2-5] or a pharmaceutically acceptable salt thereof, wherein R⁷ is hydrogen.

[2-7]
The compound according to any one of [1] to [2-6] or a pharmaceutically acceptable salt thereof, wherein R⁸ is hydrogen or a halogen.

[2-8]
The compound according to any one of [1] to [2-7] or a pharmaceutically acceptable salt thereof, wherein R⁸ is hydrogen.

[2-9]
The compound according to any one of [1] to [2-8] or a pharmaceutically acceptable salt thereof, wherein R⁹ is hydrogen.

[2-10]
The compound according to any one of [1] to [2-9] or a pharmaceutically acceptable salt thereof, wherein R¹⁰ is hydrogen.

[3]
The compound according to any one of [1] to [2-10] or a pharmaceutically acceptable salt thereof, wherein R² and R³ or R⁴ and R⁵ together with two carbon atoms to which they are attached form a tetrahydrofuran ring optionally substituted with alkyl.

[3-1]
The compound according to [3] or a pharmaceutically acceptable salt thereof, wherein R⁴ and R⁵ together with two carbon atoms to which they are attached form a tetrahydrofuran ring optionally substituted with alkyl.

[4]
The compound according to [3] or a pharmaceutically acceptable salt thereof, wherein R² and R³ together with two carbon atoms to which they are attached form a tetrahydrofuran ring optionally substituted with alkyl.

[5]
The compound according to [4] or a pharmaceutically acceptable salt thereof, wherein R² and R³ together with two carbon atoms to which they are attached form an unsubstituted tetrahydrofuran ring.

[5-1]
The compound according to any one of [3] to [5] or a pharmaceutically acceptable salt thereof, wherein the tetrahydrofuran ring formed by R² and R³ or R⁴ and R⁵ has the following structure:

wherein the carbon atoms with an asterisk (*) represent carbon atoms of the benzene ring bonded by R² and R³ or R⁴ and R⁵.

[6]
The compound according to [1] selected from the group consisting of the following compounds:

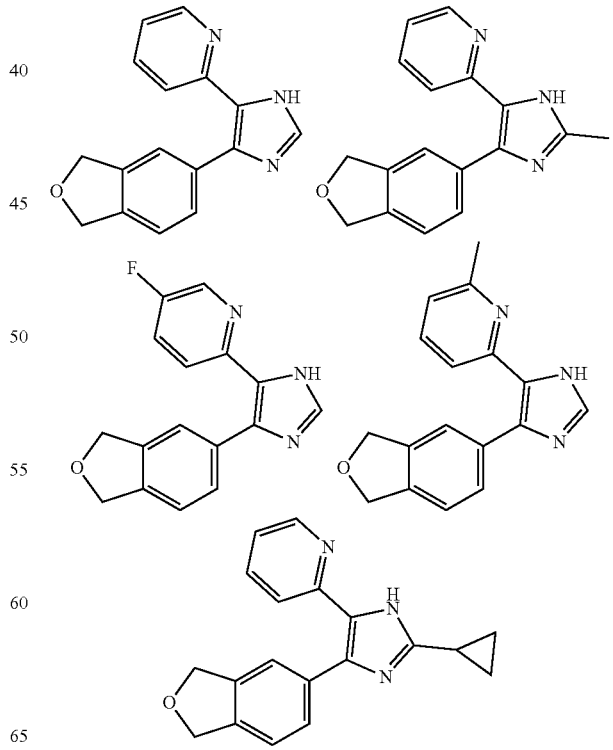

or a pharmaceutically acceptable salt thereof.

[7]

A casein kinase 1δ inhibitor, comprising the compound according to any one of [1] to [6] or a pharmaceutically acceptable salt thereof.

[8]

A therapeutic medicament for circadian rhythm sleep disorders, comprising the compound according to any one of [1] to [6] or a pharmaceutically acceptable salt thereof.

[9]

The therapeutic medicament according to [8], wherein the circadian rhythm sleep disorders are irregular sleep-wake rhythm disorder or sundowning accompanied by Alzheimer-type dementia.

[10]

A therapeutic medicament for Alzheimer-type dementia, comprising the compound according to any one of [1] to [6] or a pharmaceutically acceptable salt thereof.

[11]

An activin receptor-like kinase 5 inhibitor, comprising the compound according to any one of [1] to [6] or a pharmaceutically acceptable salt thereof.

[12]

A cancer therapeutic medicament, comprising the compound according to any one of [1] to [6] or a pharmaceutically acceptable salt thereof.

[13]

The therapeutic medicament according to [12], wherein the cancer is brain tumor, liver cancer, bladder cancer, myelodysplastic syndromes, colon cancer, or pancreatic cancer.

[14]

The therapeutic medicament according to [12] or [13] for use in combination with a cancer therapeutic medicament different from the therapeutic medicament according to [12] or [13] and/or radiotherapy.

[15]

A therapeutic medicament for corneal dystrophy, comprising the compound according to any one of [1] to [6] or a pharmaceutically acceptable salt thereof.

[16]

A therapeutic medicament for androgenetic alopecia, comprising the compound according to any one of [1] to [6] or a pharmaceutically acceptable salt thereof.

[17]

An inhibitor of casein kinase 1δ and activin receptor-like kinase 5, comprising the compound according to any one of [1] to [6] or a pharmaceutically acceptable salt thereof.

The present invention also includes the following embodiments.

[A1]

A method of inhibiting casein kinase 1δ and/or activin receptor-like kinase 5, the method comprising administering an effective amount of the compound according to any one of [1] to [6] or a pharmaceutically acceptable salt thereof to a patient in need thereof.

[A2]

A method of treating circadian rhythm sleep disorders, the method comprising administering an effective amount of the compound according to any one of [1] to [6] or a pharmaceutically acceptable salt thereof to a patient in need thereof.

[A3]

A method of treating Alzheimer-type dementia, the method comprising administering an effective amount of the compound according to any one of [1] to [6] or a pharmaceutically acceptable salt thereof to a patient in need thereof.

[A4]

A method of treating corneal dystrophy, the method comprising administering an effective amount of the compound according to any one of [1] to [6] or a pharmaceutically acceptable salt thereof to a patient in need thereof.

[A5]

A method of treating cancer, the method comprising administering an effective amount of the compound according to any one of [1] to [6] or a pharmaceutically acceptable salt thereof to a patient in need thereof.

[A6]

A method of treating androgenetic alopecia, the method comprising administering an effective amount of the compound according to any one of [1] to [6] or a pharmaceutically acceptable salt thereof to a patient in need thereof.

[B1]

The compound according to any one of [1] to [6] or a pharmaceutically acceptable salt thereof for use in inhibition of casein kinase 1δ and/or activin receptor-like kinase 5.

[B2]

The compound according to any one of [1] to [6] or a pharmaceutically acceptable salt thereof for use in treatment of circadian rhythm sleep disorders.

[B3]

The compound according to any one of [1] to [6] or a pharmaceutically acceptable salt thereof for use in treatment of Alzheimer-type dementia.

[B4]

The compound according to any one of [1] to [6] or a pharmaceutically acceptable salt thereof for use in treatment of corneal dystrophy.

[B5]

The compound according to any one of [1] to [6] or a pharmaceutically acceptable salt thereof for use in treatment of cancer.

[B6]

The compound according to any one of [1] to [6] or a pharmaceutically acceptable salt thereof for use in treatment of androgenetic alopecia.

[C1]

Use of the compound according to any one of [1] to [6] or a pharmaceutically acceptable salt thereof for inhibiting casein kinase 1δ and/or activin receptor-like kinase 5.

[C2]

Use of the compound according to any one of [1] to [6] or a pharmaceutically acceptable salt thereof for treating circadian rhythm sleep disorders.

[C3]

Use of the compound according to any one of [1] to [6] or a pharmaceutically acceptable salt thereof for treating Alzheimer-type dementia.

[C4]

Use of the compound according to any one of [1] to [6] or a pharmaceutically acceptable salt thereof for treating corneal dystrophy.

[C5]

Use of the compound according to any one of [1] to [6] or a pharmaceutically acceptable salt thereof for treating cancer.

[C6]

Use of the compound according to any one of [1] to [6] or a pharmaceutically acceptable salt thereof for treating androgenetic alopecia.

[D1]

Use of the compound according to any one of [1] to [6] or a pharmaceutically acceptable salt thereof in production of a casein kinase 1δ inhibitor and/or an activin receptor-like kinase 5 inhibitor.

[D2]

Use of the compound according to any one of [1] to [6] or a pharmaceutically acceptable salt thereof in production of a therapeutic medicament for circadian rhythm sleep disorders.

[D3]

Use of the compound according to any one of [1] to [6] or a pharmaceutically acceptable salt thereof in production of a therapeutic medicament for Alzheimer-type dementia.

[D4]

Use of the compound according to any one of [1] to [6] or a pharmaceutically acceptable salt thereof in production of a therapeutic medicament for corneal dystrophy.

[D5]

Use of the compound according to any one of [1] to [6] or a pharmaceutically acceptable salt thereof in production of a cancer therapeutic medicament.

[D6]

Use of the compound according to any one of [1] to [6] or a pharmaceutically acceptable salt thereof in production of a therapeutic medicament for androgenetic alopecia.

Advantageous Effects of Invention

The present invention can provide a compound having CK1δ inhibition activity and/or ALK5 inhibition activity, and inhibitors of CK1δ and/or ALK5, therapeutic medicaments for circadian rhythm sleep disorders, therapeutic medicaments for Alzheimer-type dementia, therapeutic medicaments for corneal dystrophy, cancer therapeutic medicaments, and therapeutic medicaments for androgenetic alopecia which contain the compound.

DETAILED DESCRIPTION OF THE PREFERRED EMBODIMENTS

Hereinafter, embodiments according to the present invention will be specifically described, but these embodiments should not be construed as limitations to the present invention, which can be subjected to a variety of modifications without departing the gist.

<Compound>

One embodiment according to the present invention relates to a compound represented by the following formula (1):

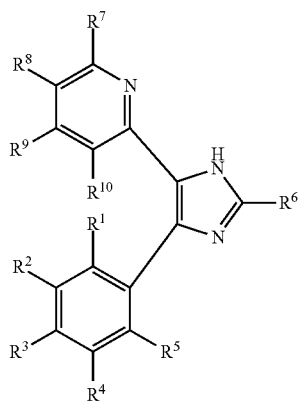

(1)

wherein $R^1$ to $R^{10}$ each independently represent hydrogen, alkyl, cycloalkyl, or a halogen, wherein $R^2$ and $R^3$ or $R^4$ and $R^5$ together with two carbon atoms to which they are attached form a 5-membered ring containing one heteroatom selected from the group consisting of an oxygen atom, a nitrogen atom, and a sulfur atom, optionally substituted with alkyl;

or a pharmaceutically acceptable salt thereof, wherein the compound excludes 2-[4-(2,3-dihydro-5-benzofuranyl)-2-(1,1-dimethylethyl)-1H-imidazol-5-yl]-6-methylpyridine). To be noted, Formula (1) also covers a tautomer having an imidazole moiety in Formula (1) wherein the proton and the double bond are relocated.

In Formula (1), preferably, $R^2$ and $R^3$ or $R^4$ and $R^5$ with the two carbon atoms to which they are attached form a 5-membered ring containing one oxygen atom (tetrahydrofuran ring), wherein the 5-membered ring may have a substituent selected from alkyl groups.

In Formula (1), more preferably, $R^2$ and $R^3$ with the two carbon atoms to which they are attached form a tetrahydrofuran ring optionally substituted with alkyl.

In Formula (1), $R^4$ and $R^5$ with the two carbon atoms to which they are attached may form a tetrahydrofuran ring optionally substituted with alkyl.

In Formula (1), still more preferably, $R^2$ and $R^3$ with the two carbon atoms to which they are attached form an unsubstituted tetrahydrofuran ring.

In Formula (1), preferably, the tetrahydrofuran ring formed by $R^2$ and $R^3$ or $R^4$ and $R^5$ has the following structure:

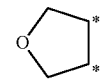

wherein the carbon atoms with the asterisk (*) represent the carbon atoms of the benzene ring bonded to $R^2$ and $R^3$ or $R^4$ and $R^5$.

In Formula (1), $R^1$ to $R^5$ are preferably hydrogen, excluding $R^2$ and $R^3$ or $R^4$ and $R^5$ which form a 5-membered ring.

In Formula (1), $R^6$ is preferably hydrogen, alkyl, or cycloalkyl, more preferably hydrogen or alkyl, still more preferably hydrogen.

In Formula (1), $R^7$ is preferably hydrogen or alkyl, more preferably hydrogen.

In Formula (1), $R^8$ is preferably hydrogen or a halogen, more preferably hydrogen.

In Formula (1), $R^9$ and $R^{10}$ are preferably hydrogen.

In this specification, the alkyl is preferably an alkyl having 1 to 6 carbon atoms, more preferably an alkyl having 1 to 3 carbon atoms, still more preferably methyl. The alkyl also includes linear and branched alkyl groups.

In this specification, the cycloalkyl is preferably a cycloalkyl having 3 to 6 carbon atoms, more preferably a cycloalkyl having 3 to 5 carbon atoms.

In this specification, the halogen is preferably fluorine, chlorine, bromine, or iodine, more preferably fluorine.

Although not particularly limited, the compound represented by Formula (1) is preferably the compounds listed below:

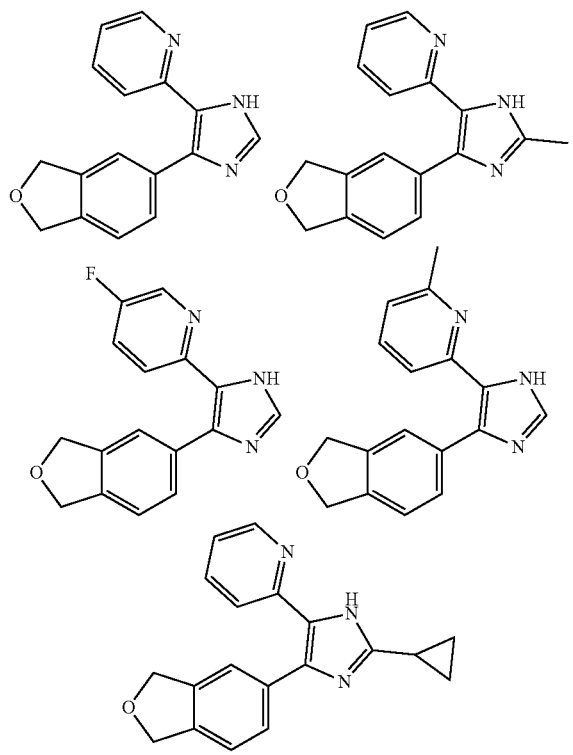

The pharmaceutically acceptable salt of the compound represented by Formula (1) can be any compound that can be used as a medicament. Examples thereof include inorganic acid salts such as hydrochloride salts, sulfate salts, nitrate salts, phosphate salts, and hydrobromide salts; and organic acid salts such as fumarate salts, maleate salts, malate salts, tartrate salts, succinate salts, citrate salts, methanesulfonate salts, p-toluenesulfonate salts, acetate salts, lactate salts, and palmitate salts.

The compound represented by Formula (1) or a pharmaceutically acceptable salt thereof may form a solvate such as a hydrate. In this specification, the solvate is included in the compound represented by Formula (1) or a pharmaceutically acceptable salt thereof.

<Kinase Inhibitor>

One embodiment according to the present invention relates to an inhibitor of CK1δ and/or ALK5 comprising the compound or a pharmaceutically acceptable salt thereof.

(Casein Kinase 1δ Inhibitor)

One embodiment according to the present invention relates to a CK1δ inhibitor. An existing CK1δ inhibitor PF-670462 may cause side effects because the concentration for CK1δ inhibition is close to that for p38α inhibition. In contrast, CK1δ inhibition concentration of the CK1δ inhibitor according to the present embodiment is sufficiently far from the p38α inhibition concentration, enabling selective inhibition of CK1δ.

Specifically, p38α inhibition concentration ($IC_{50}$)/CK1δ inhibition concentration ($IC_{50}$) is preferably 10 or more, more preferably 20 or more, still more preferably 40 or more, further more preferably 80 or more, particularly preferably 150 or more. Although not particularly limited, the upper limit of the p38α inhibition concentration ($IC_{50}$)/CK1δ inhibition concentration ($IC_{50}$) may be 10,000, 1,000, or 500, for example. The p38α inhibition concentration and the CK1δ inhibition concentration can be measured by the method according to Test Example 1 described later.

The CK1δ inhibition concentration ($IC_{50}$) of the CK1δ inhibitor according to the present embodiment is preferably 200 nM or less, more preferably 160 nM or less, still more preferably 120 nM or less, further more preferably 80 nM or less, particularly preferably 60 nM or less. Although not particularly limited, the lower limit of the CK1δ inhibition concentration ($IC_{50}$) may be 0.1 nM, 1 nM, or 10 nM, for example.

By using the CK1δ inhibitor according to the present embodiment, diseases associated with CK1δ can be treated.

(Activin Receptor-Like Kinase 5 Inhibitor)

One embodiment according to the present invention relates to an ALK5 inhibitor. The ALK5 inhibition concentration ($IC_{50}$) of the ALK5 inhibitor according to the present embodiment is preferably 400 nM or less, more preferably 300 nM or less, still more preferably 200 nM or less, further more preferably 100 nM or less, particularly preferably 50 nM or less. Although not particularly limited, the lower limit of the ALK5 inhibition concentration ($IC_{50}$) may be 0.1 nM, 1 nM, or 10 nM, for example. The ALK5 inhibition concentration can be measured by the method according to Test Example 3 described later.

By using the ALK5 inhibitor according to the present embodiment, diseases associated with ALK5 can be treated.

<Therapeutic Medicaments>

One embodiment according to the present invention relates to therapeutic medicaments for circadian rhythm sleep disorders, Alzheimer-type dementia, corneal dystrophy, cancer, and/or androgenetic alopecia which contain the compound or a pharmaceutically acceptable salt thereof.

Examples of circadian rhythm sleep disorders include sleep disorders caused by misalignment of the biological clock in a short period of time due to man-made or social reasons, and endogenic sleep disorders caused by malfunction of the function to align the biological clock with the external cycle. More specifically, examples thereof include jetlag syndromes, shift work sleep disorder, advanced sleep phase syndrome, delayed sleep phase syndrome, non-24-hour sleep-wake syndrome, irregular sleep-wake rhythm disorder, circadian rhythm disorders accompanied by Alzheimer-type dementia (such as sundowning accompanied by Alzheimer-type dementia), and circadian rhythm disorders accompanied by Parkinson's disease. Although not particularly limited, one embodiment according to the present invention is preferably used in treatment of irregular sleep-wake rhythm disorder or sundowning accompanied by Alzheimer-type dementia.

Examples of Alzheimer-type dementia include Alzheimer-type dementia accompanied by accumulation of amyloid β in the brain and Alzheimer-type dementia accompanied by accumulation of tau.

Examples of corneal dystrophy include epithelial, parenchymal, and endodermal corneal dystrophies. Although not particularly limited, one embodiment according to the present invention is preferably used in treatment of endodermal Fuchs endothelial corneal dystrophy.

Examples of cancer include brain tumors (such as glioma and glioblastoma multiforme), liver cancer (such as hepatocyte cancer), bladder cancer, myelodysplastic syndromes, colon cancer, and pancreatic cancer. Although not particularly limited, one embodiment according to the present invention is preferably used in treatment of brain tumor or liver cancer.

In treatment of cancer, a further cancer therapeutic medicament (hereinafter, referred to as "second cancer therapeutic medicament") and/or radiotherapy may be used in combination. The second cancer therapeutic medicament to be used can be existing cancer therapeutic medicaments. Although not particularly limited, examples of the second cancer therapeutic medicament include immune checkpoint blockades, vaccines for cancer therapy, antibody drugs for cancer, drugs for gene therapy, and other antitumor drugs (such as temozolomide, gemcitabine, pomalidomide, and paclitaxel). These second cancer therapeutic medicaments may be used alone or in combination. The cancer therapeutic medicament and the second cancer therapeutic medicament according to the present embodiment may be provided as a combination drug, or may be separately provided.

The therapeutic medicaments according to the present embodiment can be orally or parenterally administered. Examples of the dosage form for oral administration include pills, balls, granules, powders, capsules, syrups, emulsions, and suspensions. Examples of the dosage form for parenteral administration include injections, infusions, drips, eye drops, and suppositories.

The therapeutic medicaments according to the present embodiment may contain an excipient, a binder, a lubricant, a disintegrant, a sweetener, a surfactant, a suspending agent, an emulsifier, a colorant, a preservative, a fragrance, a flavoring substance, a stabilizer, and a thickener.

The amount of the therapeutic medicament according to the present embodiment to be administered, which depends on the condition of the patient, the weight thereof, the type of the compound, the type of disease, the administration path, and the like can be appropriately determined by a medical doctor. As one example, in treatment of circadian rhythm sleep disorders, the therapeutic medicament according to the present embodiment may be administered to an adult (weight: about 60 kg) in an amount of 0.1 to 3000 mg for oral administration and in an amount of 0.01 to 1000 mg for parenteral administration. In treatment of Alzheimer-type dementia, the therapeutic medicament according to the present embodiment may be administered to an adult (weight: about 60 kg) in an amount of 0.1 to 3000 mg for oral administration and in an amount of 0.01 to 1000 mg for parenteral administration. In treatment of endothelial corneal dystrophy, the therapeutic medicament according to the present embodiment may be administered to an adult (weight: about 60 kg) in an amount of 0.1 to 3000 mg for oral administration and in an amount of 0.001 to 1000 mg for parenteral administration. In treatment of cancer, the therapeutic medicament according to the present embodiment may be administered to an adult (weight: about 60 kg) in an amount of 0.1 to 3000 mg for oral administration and in an amount of 0.01 to 1000 mg for parenteral administration.

<Method of Producing of Compound>

The compound or a pharmaceutically acceptable salt thereof can be synthesized by appropriately using a known method. One example of the synthetic method includes Scheme A below:

<Scheme A>

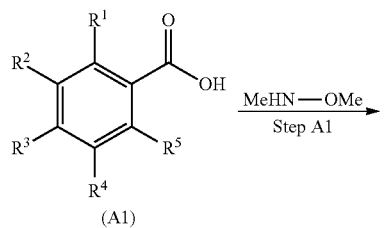

(A1)

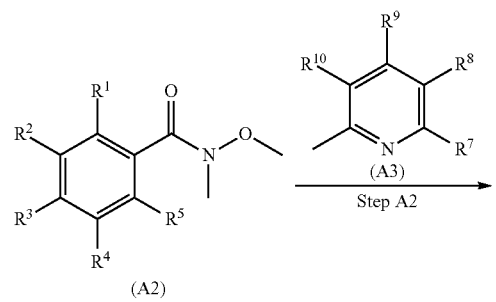

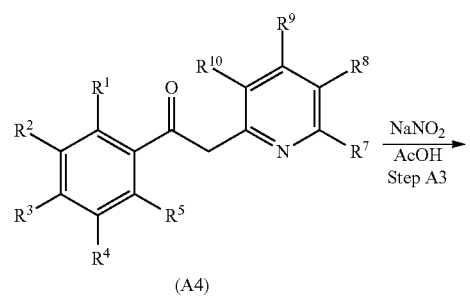

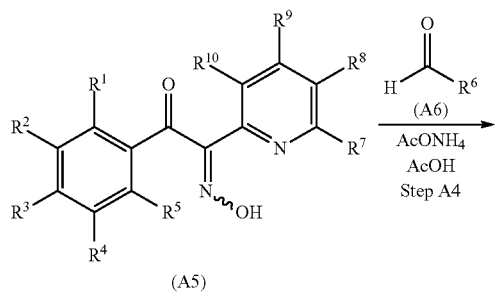

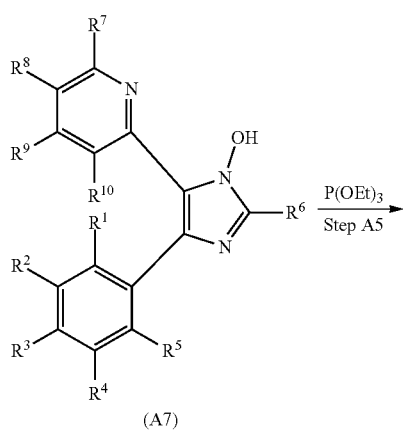

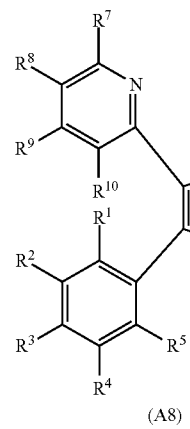

(A8)

wherein $R^1$ to $R^{10}$ are as defined above.

(Step A1)

In Step A1, a compound (A1) is reacted with N,O-dimethylhydroxylamine in the presence of a condensing agent to yield a compound (A2). The compound (A1) may be a commercial product or may be produced according to a known method.

Examples of the condensing agent used in Step A1 include, but should not be limited to, 1,1'-carbonyldiimidazole (CDI), water-soluble carbodiimide (WSC), 1-hydroxy-benzotriazole (HOBT), 1,3-dicyclohexanecarbodiimide (DCC), 1-ethyl-3-(3-dimethylaminopropyl)carbodiimide hydrochloride (EDC), 2-chloro-1-methylpyridinium iodide, 0-(benzotriazol-1-yl)-N,N,N',N'-tetramethyluronium hexafluorophosphate (HBTU), and O-(7-azabenzotriazol-1-yl)-N,N,N',N'-tetramethyluronium hexafluorophosphate (HATU).

(Step A2)

In Step A2, a compound (A3) is reacted with an organic lithium compound, and is further reacted with the compound (A2) to yield a compound (A4). The compound (A3) may be a commercial product or may be produced according to a known method.

Examples of the organic lithium compound used in Step A2 include, but should not be limited to, lithium diisopropylamide, lithium bis(trimethylsilyl)amide, methyllithium, n-butyllithium, sec-butyllithium, tert-butyllithium, and phenyllithium.

(Step A3)

In Step A3, the compound (A4) is reacted with sodium nitrite in the presence of acetic acid to yield a compound (A5).

(Step A4)

In Step A4, the compound (A5) is reacted with a compound (A6) in the presence of ammonium acetate and acetic acid to yield a compound (A7).

(Step A5)

In Step A5, the compound (A7) is reacted with triethyl phosphite to yield a compound (A8).

Examples of another synthetic method for the compound or a pharmaceutically acceptable salt thereof include Scheme B below:

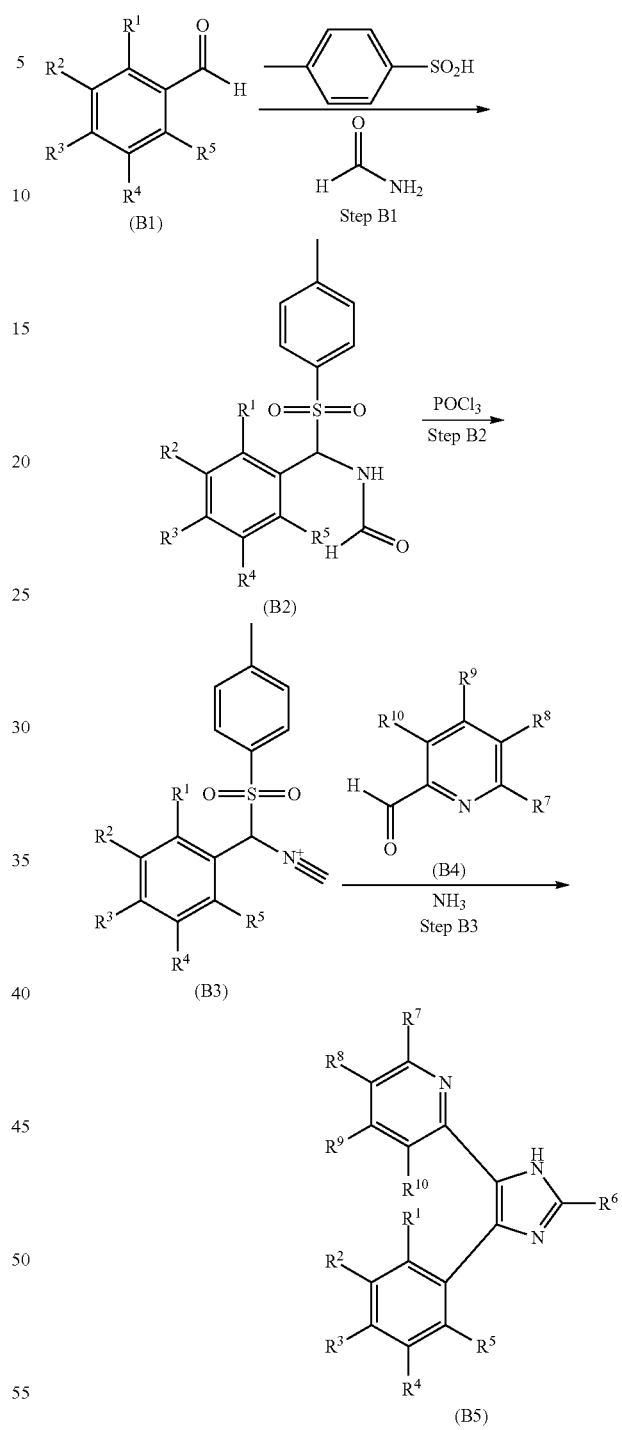

wherein $R^1$ to $R^{10}$ are as defined above.

(Step B1)

In Step B1, a compound (B1) is reacted with 4-methylbenzenesulfinic acid and formamide to yield a compound (B2). The compound (B1) may be a commercial product or may be produced according to a known method.

(Step B2)

In Step B2, the compound (B2) is reacted with phosphorus oxychloride to yield a compound (B3).

(Step B3)

In Step B3, the compound (B4) is reacted with ammonia, and is further reacted with the compound (B3) to yield a compound (B5). The compound (B4) may be a commercial product or may be produced according to a known method.

The synthetic method is not limited to Schemes A and B above. For example, synthesis may be performed through another synthetic route with reference to Production Example below.

EXAMPLES

The present invention will now be described in more detail by way of Examples, but the technical scope of the present invention is not limited by these.

Production Example 1-1

N-Methoxy-N-methyl-1,3-dihydroisobenzofuran-5-carboxamide

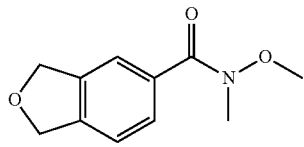

At 0° C., 1,3-dihydroisobenzofuran-5-carboxylic acid (12 g, 76 mmol) was added to a mixture of 1,1'-carbonyldiimidazole (16 g, 98 mmol) and N,N-dimethylformamide (DMF) (160 ml), followed by stirring at room temperature for two hours. The reaction mixture was controlled to have 0° C., and N,O-dimethylhydroxylamine hydrochloride (9.6 g, 98 mmol) was added at the same temperature, followed by stirring at room temperature for 12 hours. Water was then added to the reaction mixture, followed by extraction with ethyl acetate and tetrahydrofuran (2:1) three times (400 ml×3 times). The organic layer was sequentially washed with water (50 ml×two times) and brine. The organic layer was dried over magnesium sulfate, and was filtered. The solvent was then distilled off under reduced pressure. The residue was purified by silica gel column chromatography (ethyl acetate:heptane=1:1) to yield the title compound (11 g) above.

$^1$H-NMR Spectrum (CDCl$_3$) δ (ppm): 3.37 (s, 3H), 3.56 (s, 3H), 5.14 (s, 4H), 7.25-7.29 (m, 1H), 7.56 (d, J=1.10 Hz, 1H), 7.60 (dd, J=7.68, 1.46 Hz, 1H)

Production Example 1-2

1-(1,3-Dihydroisobenzofuran-5-yl)-2-(hydroxyimino)-2-(pyridin-2-yl)ethanone

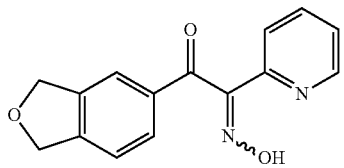 [SMILES: O=C(C(=NO)c1ccccn1)c1ccc2c(c1)COC2]

At −78° C., n-butyllithium (5.0 ml, 13 mmol) was added dropwise to a mixture of diisopropylamine (1.9 ml, 14 mmol) and tetrahydrofuran (THF) (50 ml). The solution was stirred at the same temperature for 30 minutes, and then 2-picoline (1.5 ml, 15 mmol) was added dropwise at the same temperature. The reaction mixture was stirred at 0° C. for 30 minutes, and then was cooled to −78° C. Thereafter, a mixture of N-methoxy-N-methyl-1,3-dihydroisobenzofuran-5-carboxamide (2.5 g, 12 mmol) prepared in Production Example 1-1 and THF (10 ml) was added dropwise at the same temperature. The reaction mixture was gradually heated to room temperature, and was stirred at room temperature overnight. A saturated ammonium chloride aqueous solution was added to the reaction mixture, followed by extraction with ethyl acetate. The organic layer was washed with brine, was dried over sodium sulfate, and was filtered. Then, the solvent was distilled off under reduced pressure. The residue was purified by NH-silica gel column chromatography (ethyl acetate:heptane=0:1 to 2:3 in gradient), and then was purified again under the same condition to yield a crude product of 1-(1,3-dihydroisobenzofuran-5-yl)-2-(pyridin-2-yl)ethanone (600 mg).

A mixture of sodium nitrite (0.52 g, 7.6 mmol) and water (4 ml) was added dropwise to a mixture of the crude product of 1-(1,3-dihydroisobenzofuran-5-yl)-2-(pyridin-2-yl)ethanone (1.5 g), THF (10 ml), and acetic acid (15 ml) at 0° C., followed by stirring at room temperature for 3 hours. The solvent was distilled off under reduced pressure, and then ethyl acetate and a saturated sodium bicarbonate aqueous solution were added. The organic layer was separated, and was sequentially washed with a saturated sodium bicarbonate aqueous solution, water, and brine. The organic layer was then dried over sodium sulfate, and was filtered. The solvent was then distilled off under reduced pressure. The residue was purified by NH-silica gel column chromatography (heptane:ethyl acetate:methanol=1:1:0 to 0:1:0 in gradient, and then 0:1:0 to 0:9:1 in gradient) to yield the title compound (1.3 g) in the form of a mixture of an E form and a Z form. The following shows the NMR data of the mixture of an E form and a Z form.

$^1$H-NMR Spectrum (CDCl$_3$) δ (ppm): 5.14 (s, 4H), 5.16 (s, 4H), 7.28-7.30 (m, 1H), 7.36 (d, J=7.68 Hz, 1H), 7.36 (d, J=7.68 Hz, 1H), 7.52-7.55 (m, 1H), 7.33-7.91 (m, 5H), 7.33-7.91 (m, 4H), 7.94-8.02 (m, 1H), 8.48-8.56 (m, 1H), 8.58-8.64 (m, 1H)

Example 1

2-(4-(1,3-Dihydroisobenzofuran-5-yl)-1H-imidazol-5-yl)pyridine

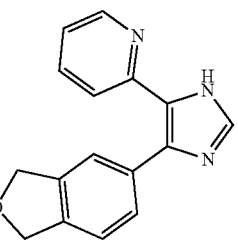

Paraformaldehyde (50 mg, 0.56 mmol) was added to a mixture of 1-(1,3-dihydroisobenzofuran-5-yl)-2-(hydroxyimino)-2-(pyridin-2-yl)ethanone (300 mg, 1.1 mmol) prepared in Production Example 1-2, ammonium acetate (520 mg, 6.7 mmol), and acetic acid (6 ml) at room temperature, followed by stirring at the same temperature for 1 hour, and then stirring at 100° C. for 15 hours. The reaction mixture was cooled to room temperature, and the solvent was distilled off under reduced pressure. Triethyl phosphite (0.38 mL, 2.2 mmol) was added to a mixture of the residue (310 mg) and N-methylpyrrolidinone (NMP) (7 mL) at room temperature, followed by stirring at 120° C. for 3 hours. The reaction mixture was controlled to have room temperature, and water and ethyl acetate were added. A saturated sodium bicarbonate aqueous solution was then added. The organic layer was separated, and the aqueous layer was extracted with ethyl acetate and tetrahydrofuran (2:1). The two organic layers were combined, and the resulting organic layer was sequentially washed with water and brine. The organic layer was dried over magnesium sulfate, and was filtered. The solvent was then distilled off under reduced pressure. The residue was purified by NH-silica gel column chromatography (ethyl acetate:methanol=20:1) to yield the title compound (44 mg) above.

$^1$H-NMR Spectrum (CDCl$_3$) δ (ppm): 5.15 (s, 2H), 5.18 (d, J=1.46 Hz, 2H), 7.12 (ddd, J=6.59, 4.76, 2.20 Hz, 1H), 7.29 (d, J=8.05 Hz, 1H), 7.48-7.57 (m, 4H), 7.75 (s, 1H), 8.55 (d, J=4.76 Hz, 1H), 10.39 (br. s., 1H)

Example 2

2-(4-(1,3-Dihydroisobenzofuran-5-yl)-2-methyl-1H-imidazol-5-yl)pyridine

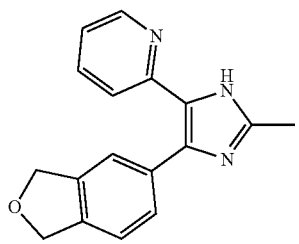 [SMILES: Cc1nc(-c2ccc3c(c2)COC3)c(-c2ccccn2)[nH]1]

Acetaldehyde (13 mg, 0.27 mmol) was added to a mixture of 1-(1,3-dihydroisobenzofuran-5-yl)-2-(hydroxyimino)-2-(pyridin-2-yl)ethanone (61 mg, 0.22 mmol) prepared in Production Example 1-2, ammonium acetate (110 mg, 1.4 mmol), and acetic acid (1.5 ml) at room temperature, followed by stirring at the same temperature for 15 minutes and then stirring at 115° C. for 15 hours. The reaction mixture was cooled to room temperature, and the solvent was distilled off under reduced pressure. Triethyl phosphite (0.38 mL, 2.2 mmol) was added to a mixture of the residue (67 mg) and NMP (1.5 mL) at room temperature, followed by stirring at 120° C. for 6 hours. The reaction mixture was controlled to have room temperature. Water and ethyl acetate were added, and then a saturated sodium bicarbonate aqueous solution was added. The organic layer was separated, and the aqueous layer was extracted with ethyl acetate and tetrahydrofuran (2:1). The two organic layers were combined, and the resulting organic layer was sequentially washed with water and brine. The organic layer was dried over magnesium sulfate, and was filtered. The solvent was distilled off under reduced pressure. The residue was purified by NH-silica gel column chromatography (ethyl acetate:methanol=40:1) to yield the title compound (44 mg) above.

$^1$H-NMR Spectrum (CDCl$_3$) δ (ppm): 2.50 (s, 3H), 5.12 (s, 2H), 5.15 (d, J=1.36 Hz, 2H), 7.04-7.09 (m, 1H), 7.22-7.28 (m, 1H), 7.43-7.54 (m, 4H), 8.50 (dt, J=4.98, 1.36 Hz, 1H), 9.97 (br d, J=3.17 Hz, 1H)

Production Example 3-1

N-((1,3-dihydroisobenzofuran-5-yl)(tosyl)methyl)formamide

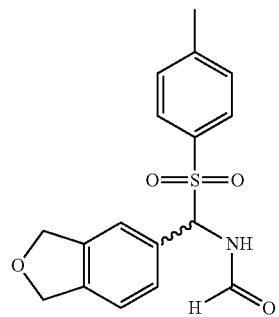 [SMILES: Cc1ccc(S(=O)(=O)C(NC=O)c2ccc3c(c2)COC3)cc1]

Chlorotrimethylsilane (3.1 ml, 25 mmol) was added to a mixture of 1,3-dihydroisobenzofuran-5-carbaldehyde (3.3 g, 22 mmol), 4-methylbenzenesulfinic acid (5.3 g, 34 mmol), formamide (2.2 ml, 56 mmol), acetonitrile (30 ml), and toluene (30 ml) at 0° C., followed by stirring at room temperature for 30 minutes. Subsequently, the resulting solution was stirred at 50° C. for 8 hours 20 minutes, and the reaction mixture was cooled to room temperature. Insoluble contents were removed by filtration, and the solvent was distilled off under reduced pressure from the filtrate. The residue was purified by silica gel column chromatography (ethyl acetate:heptane=4:1) to yield the title compound (2.9 g) above.

$^1$H-NMR Spectrum (CDCl$_3$) δ (ppm): 2.38-2.43 (m, 3H), 5.01 (t, J=5.47 Hz, 4H), 6.36-6.43 (m, 1H), 7.34-7.39 (m, 1H), 7.40-7.51 (m, 4H), 7.69-7.76 (m, 2H), 7.90-7.95 (m, 1H), 9.72-9.80 (m, 1H)

Example 3

2-(4-(1,3-Dihydroisobenzofuran-5-yl)-1H-imidazol-5-yl)-5-fluoropyridine

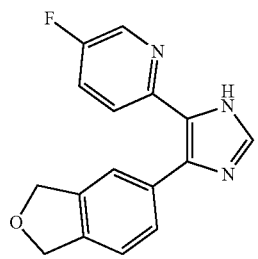 [SMILES: Fc1ccc(-c2[nH]cnc2-c2ccc3c(c2)COC3)nc1]

Phosphorus oxychloride (0.12 ml, 1.2 mmol) was added to a mixture of N-((1,3-dihydroisobenzofuran-5-yl)(tosyl)methyl)formamide (210 mg, 0.62 mmol) prepared in Production Example 3-1 and THF (2 ml) at room temperature, followed by stirring at the same temperature for 20 minutes. The reaction mixture was cooled to 0° C., and triethylamine (0.52 ml, 3.7 mmol) was added at the same temperature, followed by stirring at the same temperature for 2 hours.

Water was added to the reaction mixture at 0° C., followed by extraction with ethyl acetate. The organic layer was washed with brine, and then the solvent was distilled off under reduced pressure. The residue was filtered through NH-silica gel column chromatography (ethyl acetate). The solvent was distilled off under reduced pressure to yield a crude product of 5-(isocyano(tosyl)methyl)-1,3-dihydroisobenzofuran (190 mg). 49 mg of the 190-mg crude product was used in the next reaction.

A mixture of 5-fluoro-2-formylpyridine (19 mg, 0.16 mmol) and a 28% aqueous ammonia solution (0.50 ml) was stirred at 50° C. for 1 hour, and then the solvent was distilled off under reduced pressure. To the residue, a mixture of the crude product of 5-(isocyano(tosyl)methyl)-1,3-dihydroisobenzofuran (49 mg) and DMF (1 ml) was added at room temperature, and then potassium carbonate (54 mg, 0.39 mmol) was added, followed by stirring at room temperature overnight. Water was added to the reaction mixture, followed by extraction with ethyl acetate. The organic layer was washed with brine, and the solvent was distilled off under reduced pressure. The residue was purified by LC-MS (an acetonitrile/water solvent system containing 0.1% trifluoroacetic acid), and then was purified by NH-silica gel column chromatography (ethyl acetate:methanol=20:1) to yield the title compound (1.2 mg) above.

$^1$H-NMR Spectrum (CDCl$_3$) δ (ppm): 5.13 (s, 2H), 5.16 (d, J=1.36 Hz, 2H), 7.26 (br s, 1H), 7.28 (s, 1H), 7.49 (br s, 1H), 7.51 (br s, 2H), 7.73 (s, 1H), 8.39 (br d, J=2.27 Hz, 1H), 9.98-10.35 (m, 1H)

Example 4

2-(4-(1,3-Dihydroisobenzofuran-5-yl)-1H-imidazol-5-yl)-6-methylpyridine

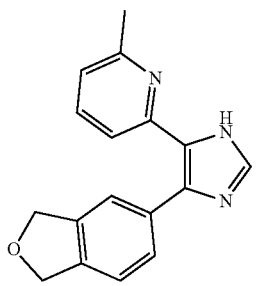 [SMILES: Cc1cccc(-c2[nH]cnc2-c2ccc3c(c2)COC3)n1]

A mixture of 6-methyl-2-pyridinecarboxaldehyde (19 mg, 0.16 mmol) and a 28% aqueous ammonia solution (0.50 ml) was stirred at 50° C. for 1 hour, and then the solvent was distilled off under reduced pressure. A mixture of the crude product of 5-(isocyano(tosyl)methyl)-1,3-dihydroisobenzofuran (49 mg) prepared in Example 3 and DMF (1 ml) was added to the residue at room temperature, and then potassium carbonate (54 mg, 0.39 mmol) was added, followed by stirring at room temperature overnight. Water was added to the reaction mixture, followed by extraction with ethyl acetate. The organic layer was washed with brine, and then the solvent was distilled off under reduced pressure. The residue was purified by LC-MS (an acetonitrile/water solvent system containing 0.1% trifluoroacetic acid), and then was purified by NH-silica gel column chromatography (ethyl acetate:methanol=20:1) to yield the title compound (2.0 mg) above.

$^1$H-NMR Spectrum (CDCl$_3$) δ (ppm): 2.54 (s, 3H), 5.13 (s, 2H), 5.15 (d, J=1.36 Hz, 2H), 6.96 (d, J=7.25 Hz, 1H), 7.26-7.33 (m, 2H), 7.37-7.43 (m, 1H), 7.51-7.55 (m, 2H), 7.72 (s, 1H), 10.22-10.57 (m, 1H)

Production Example 5-1

N-Methoxy-N-methyl-1,3-dihydroisobenzofuran-5-carboxamide

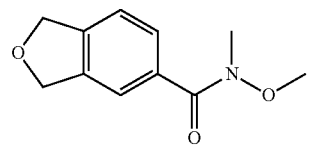

N,N-diisopropylethylamine (4.05 mL, 21.9 mmol) was slowly added to a mixture of 1,3-dihydroisobenzofuran carboxylic acid (1.20 g, 7.31 mmol), N,O-dimethylhydroxylamine hydrochloride (1.42 g, 14.6 mmol), and dichloromethane (20 mL) at 0° C., followed by stirring at the same temperature for 10 minutes. Propylphosphonic anhydride (50% ethyl acetate solution, 9.20 mL, 30.6 mmol) was slowly added to the reaction mixture, followed by stirring at room temperature for 16 hours. Ice-cold water was added to the reaction mixture, followed by extraction with dichloromethane. The organic layer was washed with brine, and was dried over sodium sulfate. The solvent was distilled off under reduced pressure. The residue was purified by silica gel column chromatography (hexane/ethyl acetate) to yield the title compound (0.90 g) above.

$^1$H NMR (400 MHz, DMSO-d$_6$) δ 7.51-7.48 (m, 2H), 7.38-7.36 (m, 1H), 5.02 (s, 4H), 3.53 (s, 3H), 3.25 (s, 3H).

Production Example 5-2

1-(1,3-Dihydroisobenzofuran-5-yl)-2-(pyridin-2-yl)ethan-1-one

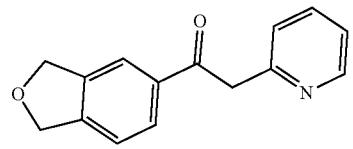 [SMILES: O=C(Cc1ccccn1)c1ccc2c(c1)COC2]

Under an argon atmosphere, lithium diisopropylamide (2 M tetrahydrofuran solution, 2.51 mL, 5.02 mmol) was slowly added to a mixture of 2-methylpyridine (0.757 mL, 7.72 mmol) and tetrahydrofuran (8.0 mL) at −78° C., followed by stirring at the same temperature for 30 minutes. A mixture of N-methoxy-N-methyl-1,3-dihydroisobenzofuran-5-carboxamide (800 mg, 3.86 mmol) and tetrahydrofuran (4 mL) was slowly added to the reaction mixture, followed by stirring at room temperature for 2 hours. A saturated ammonium chloride aqueous solution was added to the reaction mixture, followed by extraction with ethyl acetate. The organic layer was washed with brine, and was dried over sodium sulfate. The solvent was then distilled off under reduced pressure. The residue was purified by silica gel column chromatography (hexane/ethyl acetate) to yield the title compound (0.60 g) above.

ESI-MS: m/z 240.10 [M+1]+

Production Example 5-3

1-(1,3-Dihydroisobenzofuran-5-yl)-2-(hydroxyimino)-2-(pyridin-2-yl)ethane-1-one

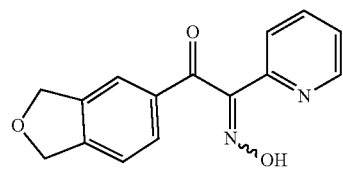 [SMILES: O=C(C(=NO)c1ccccn1)c1ccc2c(c1)COC2]

Sodium nitrite (260 mg, 3.76 mmol) containing a small amount of water was slowly added to a mixture of 1-(1,3-dihydroisobenzofuran-5-yl)-2-(pyridin-2-yl)ethane-1-one (600 mg, 2.51 mmol), tetrahydrofuran (10 mL), and acetic acid (10 mL) at 0° C., followed by stirring at room temperature for 2 hours. The solvent was distilled off from the reaction mixture under reduced pressure. A saturated sodium bicarbonate aqueous solution was added to the residue, followed by extraction with ethyl acetate. The organic layer was washed with brine, and was dried over sodium sulfate. The solvent was then distilled off under reduced pressure. The residue was purified by silica gel column chromatography (hexane/ethyl acetate) to yield the title compound (0.50 g) above.

ESI-MS: m/z 266.91 [M−1]−

Production Example 5-4

2-Cyclopropyl-4-(1,3-dihydroisobenzofuran-5-yl)-5-(pyridin-2-yl)-1H-imidazol-1-ol

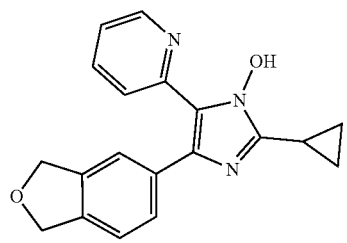 [SMILES: On1c(C2CC2)nc(-c2ccc3c(c2)COC3)c1-c1ccccn1]

Ammonium acetate (460 mg, 5.96 mmol) and cyclopropane carbaldehyde (209 mg, 2.98 mmol) were added to a mixture of 1-(1,3-dihydroisobenzofuran-5-yl)-2-(hydroxyimino)-2-(pyridin-2-yl)ethane-1-one (800 mg, 2.98 mmol) and acetonitrile (12 mL) at 0° C., followed by stirring at room temperature for 10 minutes. Trifluoroacetic acid (34.0 mg, 0.298 mmol) was added to the reaction mixture, followed by stirring at 50° C. for 16 hours. The solvent was distilled off from the reaction mixture under reduced pressure, and the residue was purified by silica gel column chromatography (dichloromethane/methanol) to yield the title compound (0.20 g) above.

ESI-MS: m/z 319.13 [M+1]+

Example 5

2-(2-Cyclopropyl-4-(1,3-dihydroisobenzofuran-5-yl)-1H-imidazol-5-yl)pyridine

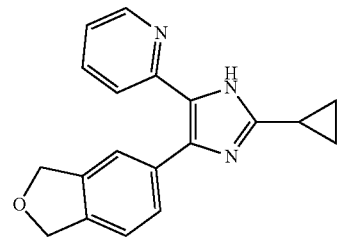 [SMILES: c1ccc(-c2[nH]c(C3CC3)nc2-c2ccc3c(c2)COC3)nc1]

A titanium(III) chloride solution (12% hydrochloric acid solution, 2.0 mL) was slowly added to a mixture of 2-cyclopropyl-4-(1,3-dihydroisobenzofuran-5-yl)-5-(pyridin-2-yl)-1H-imidazol-1-ol (200 mg, 0.626 mmol) and methanol (2 mL) at 0° C., followed by stirring at room temperature for 16 hours. The solvent was distilled off from the reaction mixture under reduced pressure. Saturated sodium bicarbonate aqueous solution was added to the residue, and the residue was filtered using Cerite while being washed with 20% methanol/dichloromethane. The organic layer separated from the filtrate was washed with brine, and was dried over sodium sulfate. The solvent was then distilled off under reduced pressure. The residue was purified by high performance liquid chromatography (X Bridge Shield (19×250 mm) 10 μm, 5 mM ammonium acetate/water) to yield the title compound (0.035 g) above.

ESI-MS: m/z 304.29 [M+1]+
$^1$H NMR (400 MHz, DMSO-$d_6$) δ 12.39, 12.13 (s, 1H), 8.57, 8.33 (d, 1H, J=4.0 Hz), 7.76-7.15 (m, 6H), 5.01, 4.99 (s, 4H), 2.08-1.97 (m, 1H).

Test Example 1

Evaluation of CK1δ Inhibitory Activity and p38α Inhibition Action

1. Preparation of Solution of Test Substance

A test substance was dissolved in dimethyl sulfoxide (DMSO). The solution was further diluted with DMSO to prepare a solution at a concentration 100-fold greater than the test concentration. The solution was further 25-fold diluted with an assay buffer to prepare a solution of the test substance. The positive control substance was also treated as above to prepare a solution of the positive control substance.

2. Preparation of Kinase Protein

CK1δ: Used was the human CK1δ prepared by fusing GST (61 KDa) with the N-terminal of the human CK1δ enzyme activity domain (1-294 amino acid sequence site in accession number NP_001884.2), followed by expression in E. coli and then refining by a glutathione sepharose chromatography system.

p38α: Used was the human p38α prepared as followed: GST (66 KDa) was fused with the N-terminal of the 9-352 amino acid sequence site in accession number NP_620581.1, followed by expression in E. coli and then refining by a glutathione sepharose chromatography system, and the product was activated with His-tagged MAP2K6, and was again purified by the glutathione sepharose chromatography system.

3. Reagent and Test Method

5 µL of a 4-fold solution of the test substance prepared with an assay buffer (20 mM HEPES, 0.01% Triton X-100, 2 mM DTT, pH: 7.5), 5 µL of a 4-fold substrate/ATP/metal solution, and 10 µL of a 2-fold kinase solution were mixed in wells of a 384-well plate made of polypropylene, and were reacted at room temperature for 1 hour. 70 µL of Termination Buffer (QuickScout Screening Assist MSA; Carna Biosciences) was added to terminate the reaction. The substrate peptide and phosphorylated peptide in the reaction solution were separated by a LabChip system (Perkin Elmer), and were quantitated. The kinase reaction was evaluated based on the product ratio (P/(P+S)) calculated from the substrate peptide peak height (S) and the phosphorylated peptide peak height (P).

4. Reaction Condition

TABLE 1

| Kinase | Substrate Name | ATP (µM) | Mg (mM) |
|---|---|---|---|
| CK1δ | CKtide | 1 | 10 | 5 |
| p38α | Modified Erktide | 1 | 150 | 5 |

5. Data Analysis

The average signal from control wells containing all the reaction components was defined as 0% inhibition, and the average signal from background wells (enzyme not added) was defined as 100% inhibition. The inhibition rate was calculated from the average signal of test wells containing each test substance. The $IC_{50}$ value was determined through approximation of the plot against the test substance concentration and the inhibition rate to a 4-parameter logistic curve by non-linear least squares. The results are shown in Table 2. The compounds in Examples had good CK1δ inhibition activity. A large difference was found between the CK1δ inhibition concentration and the p38α inhibition concentration.

TABLE 2

| | CK1δ($IC_{50}$, nM) | p38α ($IC_{50}$, nM) | Ratio (p38α/CK1δ) |
|---|---|---|---|
| Example 1 | 21 | 4000 | 190 |
| Example 2 | 68 | >10000 | >150 |
| Example 3 | 48 | 4400 | 92 |
| Example 4 | 110 | 5200 | 47 |

Test Example 2

Evaluation of ALK5 Inhibition Action

1. Preparation of Solution of Test Substance

A 10% DMSO stock solution (compound concentration: 10 mM) containing 0.1 mg/mL BSA (bovine serum albumin) was prepared as a solution of the test substance.

2. Kinase

ALK5: Human ALK5, GenBank ID=BC071181.

3. Reagent, Test Method, and Reaction Conditions

A kinase assay was performed using ADP-Glo™ assay kit available from Promega Corporation according to the following assay reaction recipe:

Component 1: 1 µL diluted active protein kinase
Component 2: 1 µL of the substrate
Component 3: 1 µL kinase assay buffer
Component 4: 1 µL of the compound (10 concentrations) or 10% DMSO
Component 5: 1 µL ATP stock (25 µM final well concentration)

The assay started with incubation of the reaction mixture in a 384-well plate at room temperature for 40 minutes. After the incubation, 5 µL ADP-Glo™ reagent was added. The plate was shaken, followed by incubation at room temperature for 40 minutes. Thereafter, 10 µL of a kinase detection reagent was added, and the plate was shaken, followed by incubation at room temperature for 30 minutes. The plate was measured on a GloMax plate reader using ADP-Glo™ Luminescence Protocol. For the blank control, the assay was performed using all the assay components except that an appropriate substrate (replaced with the same amount of assay dilution buffer) was added. The corrected activity value was calculated by subtracting the value of the blank control from the measured value.

4. Data Analysis

The relative luminescence unit (RLU) was measured at 10 compound concentrations between 0.3 nM and 10,000 nM. The inhibition rate was calculated as follows:

{(Control RLU−Test RLU)/(Control RLU−Background RLU)}×100

Non-linear regression analysis was performed using GraphPad Prism version 5.01 to determine the $IC_{50}$ value. The results are shown in Table 3. It revealed that the compound in Example 1 has good ALK5 inhibition activity.

TABLE 3

| | ALK5 ($IC_{50}$, nM) |
|---|---|
| Example 1 | 31 |

Test Example 3

Evaluation of ALK5 Inhibition Action

Using a human recombinant GST-tagged TGFB available from SignalChem (Catalog No. T07-11G), a substrate peptide TGFBR1 Peptide (Catalog No. T36-58), and ADP-Glo assay kit (Promega Corporation), measurement was performed on a 5-µL reaction system in a 384-well plate (GloMax plate reader) according to the document attached to the ADP-Glo assay kit. For the reaction conditions used, the enzyme concentration was 5 ng/µL, the substrate concentration was 200 ng/µL, the ATP concentration was 25 µM, and the reaction time was 2 hours. The $IC_{50}$ value was calculated using GraphPad Prism version 5.01 based on the inhibition rate where the test substance (8 to 10 concentrations, diluted 3-fold from 3000 nM) was added.

TABLE 4

| | $IC_{50}$ (nM) |
|---|---|
| Example 4 | 46 |
| Example 5 | 330 |

Test Example 4

Evaluation of CK1δ Inhibition Action

Using a human recombinant GST-tagged CK1δ available from SignalChem (Catalog No. C65-10G), a substrate peptide Casein Dephosphorylated (Catalog No. C03-54BN), and ADP-Glo assay kit (Promega Corporation), measurement was performed on a 5-µL reaction system in a 384-well plate (GloMax plate reader) according to the document attached to the ADP-Glo assay kit. For the reaction conditions used, the enzyme concentration was 2 ng/μL, the substrate concentration was 200 ng/μL, the ATP concentration was 25 μM, and the reaction time was 40 minutes. The IC$_{50}$ value was calculated using GraphPad Prism version 5.01 based on the inhibition rate where the test substance (8 to 10 concentrations, diluted 3-fold from 3000 nM) was added.

TABLE 5

| | IC$_{50}$ (nM) |
|---|---|
| Example 5 | 200 |

Test Example 5

Evaluation of p38α Inhibition Action

Using a human recombinant GST-tagged p38α available from SignalChem (Catalog No. M39-10 BG), a substrate peptide p38 Substrate (Catalog No. P03-58), and ADP-Glo assay kit (Promega Corporation), measurement was performed on a 5-μL reaction system in a 384-well plate (GloMax plate reader) according to the document attached to the ADP-Glo assay kit. For the reaction conditions used, the enzyme concentration was 2 ng/μL, the substrate concentration was 100 ng/μL, the ATP concentration was 25 μM, and the reaction time was 40 minutes. The IC$_{50}$ value was calculated using GraphPad Prism version 5.01 based on the inhibition rate where the test substance (8 to 10 concentrations, diluted 3-fold from 3000 nM) was added.

TABLE 6

| | IC$_{50}$ (nM) |
|---|---|
| Example 5 | >3000 |

What is claimed is:

1. A compound represented by the following formula (1):

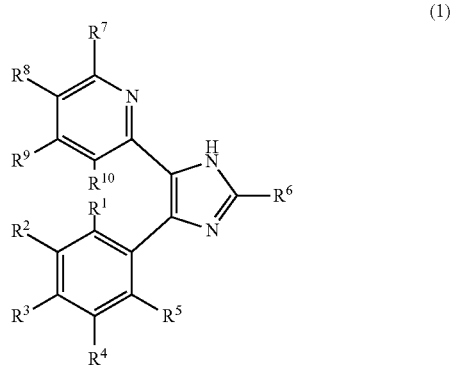

(1)

wherein
R$^1$ to R$^{10}$ each independently represent hydrogen, alkyl, cycloalkyl, or a halogen, wherein
R$^2$ and R$^3$ or R$^4$ and R$^5$ together with two carbon atoms to which they are attached form a tetrahydrofuran ring having the following structure:

wherein the carbon atoms with an asterisk (*) represent carbon atoms of the benzene ring bonded by R$^2$ and R$^3$ or R$^4$ and R$^5$, wherein the tetrahydrofuran ring is optionally substituted with alkyl;
or a pharmaceutically acceptable salt thereof.

2. The compound according to claim 1 or a pharmaceutically acceptable salt thereof, wherein
R$^1$ to R$^{10}$ each independently represent hydrogen, alkyl, or a halogen.

3. The compound according to claim 1 or a pharmaceutically acceptable salt thereof, wherein R$^2$ and R$^3$ together with two carbon atoms to which they are attached form the tetrahydrofuran ring optionally substituted with alkyl.

4. The compound according to claim 3 or a pharmaceutically acceptable salt thereof, wherein R$^2$ and R$^3$ together with two carbon atoms to which they are attached form the unsubstituted tetrahydrofuran ring.

5. The compound according to claim 1, selected from the group consisting of the following compounds:

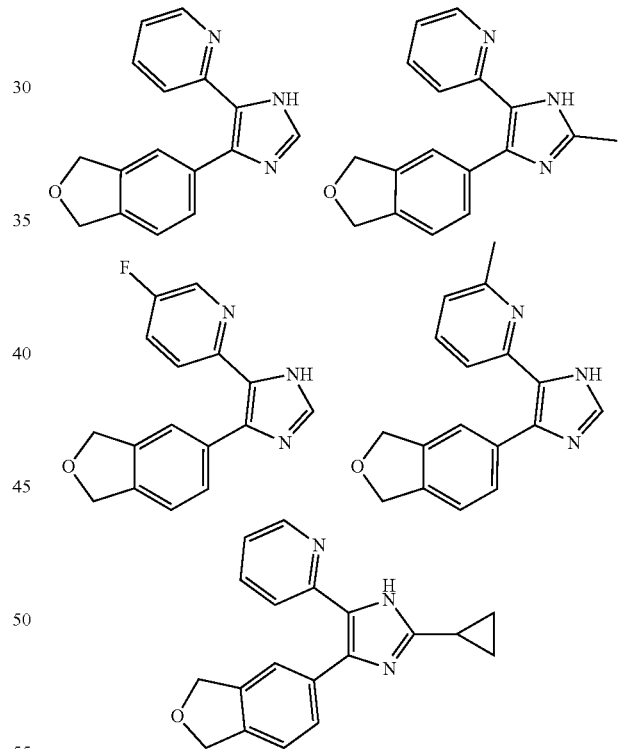

or a pharmaceutically acceptable salt thereof.

6. A casein kinase 1δ inhibitor comprising the compound according to claim 1 or a pharmaceutically acceptable salt thereof.

7. A therapeutic medicament for circadian rhythm sleep disorders, comprising the compound according to claim 1 or a pharmaceutically acceptable salt thereof.

8. The therapeutic medicament according to claim 7, wherein the circadian rhythm sleep disorders are irregular sleep-wake rhythm disorder or sundowning accompanied by Alzheimer-type dementia.

9. A therapeutic medicament for Alzheimer-type dementia, comprising the compound according to claim 1 or a pharmaceutically acceptable salt thereof.

10. An activin receptor-like kinase 5 inhibitor comprising the compound according to claim 1 or a pharmaceutically acceptable salt thereof.

11. A cancer therapeutic medicament, comprising the compound according to claim 1 or a pharmaceutically acceptable salt thereof.

12. The therapeutic medicament according to claim 11, wherein the cancer is brain tumor, liver cancer, bladder cancer, myelodysplastic syndromes, colon cancer, or pancreatic cancer.

13. The therapeutic medicament according to claim 11, for use in combination with a cancer therapeutic medicament different from the therapeutic medicament according to claim 12 and/or radiotherapy.

14. A therapeutic medicament for corneal dystrophy, comprising the compound according to claim 1 or a pharmaceutically acceptable salt thereof.

15. A therapeutic medicament for androgenetic alopecia, comprising the compound according to claim 1 or a pharmaceutically acceptable salt thereof.

16. An inhibitor of casein kinase 1δ and activin receptor-like kinase 5, comprising the compound according to claim 1 or a pharmaceutically acceptable salt thereof.

* * * * *